(12) United States Patent
Kozaka et al.

(10) Patent No.: US 11,639,061 B2
(45) Date of Patent: May 2, 2023

(54) INK JET INK COMPOSITION, INK PACK, AND INK JET PRINTING METHOD

(71) Applicant: Seiko Epson Corporation, Tokyo (JP)

(72) Inventors: Nao Kozaka, Matsumoto (JP); Yuki Wakushima, Matsumoto (JP); Yoshitaka Miyajima, Matsumoto (JP); Takeshi Yano, Shiojiri (JP); Chitae Hashizume, Matsumoto (JP)

(73) Assignee: SEIKO EPSON CORPORATION

( * ) Notice: Subject to any disclaimer, the term of this patent is extended or adjusted under 35 U.S.C. 154(b) by 796 days.

(21) Appl. No.: 16/580,036

(22) Filed: Sep. 24, 2019

(65) Prior Publication Data
US 2020/0095443 A1 Mar. 26, 2020

(30) Foreign Application Priority Data
Sep. 25, 2018 (JP) .............................. JP2018-178364

(51) Int. Cl.
| | | |
|---|---|---|
| C09D 11/328 | (2014.01) | |
| C09D 11/38 | (2014.01) | |
| D06P 1/18 | (2006.01) | |
| D06P 1/645 | (2006.01) | |
| B41J 2/21 | (2006.01) | |
| B41J 2/175 | (2006.01) | |
| B41M 5/00 | (2006.01) | |
| B41J 2/01 | (2006.01) | |
| C09D 11/322 | (2014.01) | |

(52) U.S. Cl.
CPC ............... *B41J 2/2107* (2013.01); *B41J 2/01* (2013.01); *B41J 2/17503* (2013.01); *B41M 5/0023* (2013.01); *C09D 11/322* (2013.01); *C09D 11/328* (2013.01); *C09D 11/38* (2013.01); *D06P 1/18* (2013.01); *D06P 1/645* (2013.01)

(58) Field of Classification Search
CPC ..... C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41J 3/4078; B41J 11/0021; B41J 11/002; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41F 23/042; B41F 23/0436; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 5,092,926 A | 3/1992 | Owatari | |
| 6,086,660 A | 7/2000 | Mukaiyama et al. | |
| 2007/0120920 A1* | 5/2007 | Taguchi | ............... C09D 11/328 106/31.47 |
| 2009/0040249 A1* | 2/2009 | Wouters | ................. B41J 2/1707 347/7 |
| 2010/0085396 A1* | 4/2010 | Yokota | ..................... B41J 2/175 347/17 |
| 2011/0109708 A1* | 5/2011 | Kuwabara | ............ C09D 11/326 524/553 |
| 2011/0148962 A1* | 6/2011 | Kaneko | ................ B41J 2/04588 347/10 |
| 2013/0100221 A1* | 4/2013 | Van Dyck | .......... B41J 11/00214 347/102 |
| 2013/0321520 A1* | 12/2013 | Ito | .......................... B41J 2/2107 347/100 |
| 2014/0375733 A1* | 12/2014 | Murai | ....................... B41J 2/00 524/106 |

(Continued)

FOREIGN PATENT DOCUMENTS

| | | |
|---|---|---|
| JP | H02-97577 A | 4/1990 |
| JP | H11-217527 A | 8/1999 |

(Continued)

OTHER PUBLICATIONS

Sirbiladze, K.J., et al., Science Digest, Dyes and Pigments, "The role of free radical transformation in the photodegradation of reactive dyed cellulosic textiles", vol. 19, Issue 4, 1992, pp. 235-247 (14 pgs.).

*Primary Examiner* — Manish S Shah

(74) *Attorney, Agent, or Firm* — Harness, Dickey & Pierce, P.L.C.

(57) ABSTRACT

An ink jet ink composition contains a dye having an azo group, water, and a hindered amine compound having a radical. The dissolved nitrogen concentration of the ink composition is 10 ppm or less.

10 Claims, No Drawings

(56) References Cited

U.S. PATENT DOCUMENTS

| | | |
|---|---|---|
| 2015/0130881 A1 | 5/2015 | Oguchi et al. |
| 2015/0266308 A1* | 9/2015 | Aoyama .............. B41J 2/17513 347/92 |
| 2019/0255869 A1* | 8/2019 | Asakawa ............. B41J 11/0015 |

FOREIGN PATENT DOCUMENTS

| | | |
|---|---|---|
| JP | 2001-139851 A | 5/2001 |
| JP | 2002-179963 A | 6/2002 |
| JP | 2003-206408 A | 7/2003 |
| JP | 2015-093957 A | 5/2015 |
| JP | 2015-117297 A | 6/2015 |
| JP | 2015-178207 A | 10/2015 |

* cited by examiner

INK JET INK COMPOSITION, INK PACK, AND INK JET PRINTING METHOD

The present application is based on, and claims priority from, JP Application Serial Number 2018-178364, filed Sep. 25, 2018, the disclosure of which is hereby incorporated by reference herein in its entirety.

BACKGROUND

1. Technical Field

The present disclosure relates to an ink jet ink composition, an ink pack, and an ink jet printing method.

2. Related Art

Ink jet printing methods, which enable high-definition printing with a relatively simple apparatus, continue to be rapidly developed in various fields. For an ink jet printing method, image quality or the like in such a method is studied from various viewpoints. For example, JP-A-2001-139851 discloses a light fastness imparting agent for printing containing a compound having a nitroxide radical and/or an N-oxide, and a printing liquid (or recording liquid) containing the light fastness imparting agent, from the viewpoint of preventing the resulting image from discoloring or fading and from the viewpoint of stably maintaining image quality.

This disclosure does not take into account the influence of the light fastness imparting agent on ejection consistency and on color development.

SUMMARY

The present inventors conducted intensive research to solve the issues of ejection consistency and color development and found that a composition that contains a dye having an azo group and a hindered amine compound and has a controlled dissolved nitrogen concentration solves the above issues.

The subject matter disclosed herein is intended to solve the above issues and is implemented as the following embodiments or applications.

Application 1

According to an aspect of the present disclosure, there is provided an ink jet ink composition containing a dye having an azo group, water, and a hindered amine compound having a radical. The dissolved nitrogen concentration in the ink composition is 10 ppm or less.

Application 2

In the ink jet ink composition of Application 1, the dissolved nitrogen concentration may be 2 ppm or less.

Application 3

In the ink jet ink composition of Application 1, the hindered amine compound may have a hydroxy group.

Application 4

In the ink jet ink composition of Application 1, the dye having azo group may be contained in the ink jet ink composition in a proportion of from 2.5 to 10 relative to the mass of the hindered amine compound.

Application 5

In the ink jet ink composition of Application 1, the hindered amine compound may have a molecular weight of from 100 to 800.

Application 6

The ink jet ink composition of Application 1 may be used for textile printing.

Application 7

In the ink jet ink composition of Application 1, the dye is at least one selected from the groups consisting of Reactive Blue 13, Reactive Orange 35, Disperse Blue 360, and Acid Blue 193.

Application 8

The ink jet ink composition of Application 1 may be stored in a container that is permeable to 2 ppm or more of nitrogen.

Application 9

According to another aspect of the present disclosure, an ink pack is provided. The ink pack includes a container that is permeable to 2 ppm or more of nitrogen, and the ink jet ink composition of Application 1 stored in the container.

Application 10

According to another aspect of the present disclosure, an ink jet printing method is provided. The method includes ejecting the ink jet ink composition of Application 1 to apply the ink composition onto a printing medium.

DESCRIPTION OF EXEMPLARY EMBODIMENTS

Some embodiments of the subject matter of the present disclosure will now be described. However, the implementation of the subject matter is not limited to the disclosed embodiments, and various modifications may be made without departing from the scope and spirit of the present disclosure.

Ink Jet Ink Composition

The ink jet ink composition (hereinafter simply referred to as the ink composition) disclosed herein contains a dye having an azo group (hereinafter referred to as azo group-containing dye), water, and a hindered amine compound having a radical and has a dissolved nitrogen concentration of 10 ppm or less. The ink composition may optionally contain a dispersant, a nitrogen-containing heterocyclic compound, a surfactant, an alkylpolyol, and other constituents.

It has been found that when azo group-containing dyes are used in an ink, the azo group is decomposed to generate nitrogen ($N_2$) in the ink, consequently increasing the dissolved nitrogen concentration in the ink with time. During ink jet ejection, such an increase in the dissolved nitrogen concentration causes air bubbles to be produced in the ink flow channels and in the ink jet head and results in inconsistent ejection.

On the other hand, in the ink composition disclosed herein, the hindered amine compound having a radical inhibits the azo group-containing dye from decomposing, thus promoting consistent ejection of the ink composition. In spite of high color developability, the use of azo group-containing dyes is often avoided in view of ejection consistency. However, in the ink composition of the present disclosure, such an azo group-containing dye can be used without degrading ejection consistency.

Azo Group-Containing Dye

Examples of the azo group-containing dye include, but are not limited to, azo acid dyes, such as C.I. Acid Blues 29 and 193, C.I. Acid Yellow 11, C.I. Acid Orange 7, C.I. Acid Reds 37 and 180, C.I. Direct Reds 28 and 83, C.I. Direct Yellow 12, C.I. Direct Orange 26, C.I. Direct Greens 28 and 59, C.I. Reactive Blue 13, C.I. Reactive Orange 35, C.I. Reactive Yellow 2, C.I. Reactive Reds 17 and 120, C.I. Reactive Black 5, and C.I. Disperse Blue 360; azo basic dyes, such as C.I. Basic Blue 41 and C.I. Basic Red 18; nonionic azo dyes, such as C.I. Disperse Blue 165, C.I.

Disperse Orange 5, and C.I. Disperse Red 58; pyridone azo dyes; diazo dyes; monoazo dyes; pyrazole azo dyes; and azomethine dyes. Such azo dyes may be used individually or in combination.

In some embodiments, at least one of Reactive Blue 13, Reactive Orange 35, Disperse Blue 360, and Acid Blue 193 may be used. It is beneficial to use Reactive Blue 13 because the use of such an azo dye tends to enhance color development. For the use of Reactive Blue 13, if the azo group thereof is decomposed, ejection consistency may be degraded. The ink jet ink composition of the present disclosure, however, can maintain ejection consistency.

The azo group-containing dye content may be, by mass, from 1% to 15%, for example, from 2% to 12.5% or from 5% to 15%, relative to the total mass of the ink composition. When the azo group-containing dye content is in such a range, the resulting printed item tends to have satisfactorily developed colors, and the ink composition can be continuously ejected stably.

The proportion, on a mass basis, of the azo group-containing dye content to the hindered amine compound content may be from 1.5 to 25, for example, from 2 to 15 or from 2.5 to 10. When the proportion of the azo group-containing dye content to the hindered amine compound content is in such a range, the ink composition can be continuously ejected stably. More specifically, the molecules of the hindered amine compound may be associated, consequently reducing the effect of the hindered amine compound on reducing inconsistent ejection caused by dissolved nitrogen. When the proportion of the azo group-containing dye content to the hindered amine compound content is 1.5 or more, however, the effect of the hindered amine compound to reduce inconsistent ejection is retained. When the proportion is 25 or less, the hindered amine compound can exhibit such an effect effectively. Also, when the proportion of the azo group-containing dye content to the hindered amine compound content is 1.5 or more, that is, as the amount of hindered amine compound content is reduced, the color of the ink composition is not likely to be changed by the hindered amine compound.

Hindered Amine compound

The hindered amine compound used in the ink composition disclosed herein has a radical. Examples of such a hindered amine compound include, but are not limited to, 4-hydroxy-2,2,6,6-tetramethylpiperidine-N-oxyl, tetramethylpiperidine-N-oxyl, and other compounds having an N-oxy-2,2,6,6-tetramethylpiperidine structure.

In some embodiments, hindered amine compounds having a hydroxy group, such as 4-hydroxy-2,2,6,6-tetramethylpiperidine-N-oxyl may be used. Such compounds tend to be soluble.

The hindered amine compound used in the ink composition disclosed herein has a molecular weight of from 100 to 800, for example, from 100 to 600 or from 100 to 400. Such a hindered amine compound is soluble and favorable for consistent continuous ejection. Also, as the amount of the hindered amine compound content is reduced, the color of the ink composition is not more likely to be changed by the hindered amine compound.

The content of the hindered amine compound having a radical (hereinafter referred to as radical-containing hindered amine compound) may be, by mass, from 0.1% to 10%, for example, from 0.2% to 7.5% or for 0.5% to 5%, relative to the total mass of the ink composition. When the radical-containing hindered amine compound content is in such a range, the resulting printed item can have satisfactorily developed colors. In addition, the radical-containing hindered amine compound with such content tends to be soluble in the ink composition and beneficial for consist continuous ejection.

Water

The water content in the ink composition may be, by mass, from 35% to 80%, for example, from 40% to 75% or from 45% to 70%, relative to the total mass of the ink composition. Nitrogen-Containing Heterocyclic Compound Examples of the nitrogen-containing heterocyclic compound include, but are not limited to, 2-pyrrolidone, N-methyl-2-pyrrolidone, and N-ethyl-2-pyrrolidone. In some embodiments, 2-pyrrolidone may be used. A nitrogen-containing heterocyclic compound may be used individually, or a plurality of nitrogen-containing heterocyclic compounds may be used in combination. Nitrogen-containing heterocyclic compounds tend to be soluble and are beneficial for stably storing the ink composition accordingly. Also, the use thereof tends to enhance the continuous ejection consistency of the ink composition.

The nitrogen-containing heterocyclic compound content in the ink composition may be, by mass, from 3% to 17.5%, for example, from 5% to 15% or from 7.5% to 12.5%, relative to the total mass of the ink composition. The nitrogen-containing heterocyclic compound with such content tends to be soluble in the ink composition and is beneficial for consist continuous ejection.

Surfactant

The surfactant may be, but is not limited to, an acetylene glycol-based surfactant, a fluorosurfactant, or a silicone surfactant. Acetylene glycol-based surfactants and silicone surfactants are beneficially used. In some embodiments, an acetylene glycol-based surfactant may be used.

The acetylene glycol-based surfactant used in the ink composition disclosure herein may be, but is not limited to, at least one selected from the group consisting of 2,4,7,9-tetramethyl-5-decyne-4,7-diol and alkylene oxide adducts thereof, and 2,4-dimethyl-5-decyne-4-ol and alkylene oxide adducts thereof. Acetylene glycol-based surfactants are commercially available, and examples thereof include, but are not limited to, OLFINE 104 series and OLFINE E series, such as OLFINE E1010, (all products of Air Products and Chemicals Inc.); and SURFYNOL 465 and SURFYNOL 61 (both products of Nissin Chemical Industry). An acetylene glycol-based surfactant may be used individually, or a plurality of acetylene glycol-based surfactants may be used in combination.

The silicone surfactant used in the ink composition disclosed herein may be a polysiloxane compound or a polyether-modified organosiloxane. Silicone surfactants are commercially available, and examples thereof include, but are not limited to, BYK-306, BYK-307, BYK-333, BYK-341, BYK-345, BYK-346, BYK-347, BYK-348, and BYK-349 (all produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all produced by Shin-Etsu Chemical). A silicone surfactant may be used individually, or a plurality of silicone surfactants may be used in combination.

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxide compounds. Fluorosurfactants are commercially available, and examples thereof include, but are not limited to, S-144 and S-145 (both produced by Asahi Glass); FC-170C, FC-430, and Fluorad FC-4430 (all produced by Sumitomo 3M); FSO, FSO-100, FSN, FSN-100, and FS-300 (all produced by Dupont); and FT-250 and FT-251 (both produced by Neos). A fluorosurfactant may be used individually, or a plurality of fluorosurfactants may be used in combination.

The surfactant content in the ink composition may be, by mass, from 0.1% to 3%, for example, from 0.1% to 1%, relative to the total mass of the ink composition. When the surfactant content is in such a range, the ink composition tends to be continuously ejected stably.

Alkylpolyol

Exemplary alkylpolyols include, but are not limited to, diethylene glycol, propylene glycol, 1,3-propanediol, 1,2-butanediol, 1,3-butanediol, 1,4-butanediol, 1,2-pentanediol, 1,5-pentanediol, 1,2-hexanediol, and 1,6-hexanediol. In some embodiments, diethylene glycol, propylene glycol, or 1,2-hexanediol may be used. The alkylpolyols used herein do not include glycerin and, in this viewpoint, may be referred to as alkyldiols.

The alkylpolyol content in the ink composition may be, by mass, from 1% to 35%, for example, from 3% to 30% or from 5% to 25%, relative to the total mass of the ink composition. When the alkylpolyol content is in such a range, the ink composition tends to be continuously ejected stably.

Dispersant

The dispersant may be, but is not limited to, a urethane resin. The dispersant content in the ink composition may be, by mass, from 0.1% to 6%, for example, from 0.5% to 5% or from 1% to 3%, relative to the total mass of the ink composition. When the dispersant content is in such a range, the ink composition tends to be stably ejected.

Other Constituents

The ink composition may optionally contain other substances as additives, and examples thereof include, but are not limited to, a moisturizing agent, such as urea, a solubilizing agent, a viscosity modifier, a pH adjuster, such as triethanolamine, an antioxidant, a preservative, such as proxel or benzotriazole, an antifungal agent, a corrosion inhibitor, a chelating agent, such as EDTA, and an organic solvent, such as glycerin, triethylene glycol monomethyl ether or triethylene glycol monobutyl ether. In some embodiments, the ink composition may be an aqueous ink composition containing water as the major volatile constituent in view of safety.

Dissolved Nitrogen Concentration

The dissolved nitrogen concentration of the ink composition is 10 ppm or less and is beneficially 5 ppm or less or 2 ppm or less. The lower limit of the dissolved nitrogen concentration is not particularly limited, but, beneficially, dissolved nitrogen is not detected. The ink composition with a dissolved nitrogen concentration of 10 ppm or less can be continuously ejected more stably. The dissolved nitrogen concentration can be measured by the method that will be described in the Examples.

The ink composition disclosed herein may be used for textile printing. In textile printing, printed media are washed in the course of the process. Accordingly, even if the color of the ink composition is changed by the radical-containing hindered amine compound, the color of the resulting printed textile is not much affected because the hindered amine compound is washed out.

The ink composition may be stored in a container that is permeable to 2 ppm or more of nitrogen. Even if the ink composition is stored in such a container, the decomposition of the azo group-containing dye is suppressed, and the ink composition can be continuously ejected stably.

Dissolved nitrogen concentration can be measured by known methods and, for example, may be measured in terms of mass using, for example, a gas chromatograph 6890N (manufactured by Agilent).

Ink Pack

The ink pack of the present disclosure includes a container that is permeable to 2 ppm or more of nitrogen, and the above-described ink composition stored in the container. The pack includes a container portion to contain the ink composition, and an ink supply port. The container may be in, but is not limited to, the form of a cartridge, a bottle, a tank, or any other container of indefinite shape.

The container may be made of any material, provided that it is permeable to 2 ppm or more of nitrogen. Examples of the container material include, but are not limited to, polyolefins, such as polypropylene (PP) and polyethylene; other plastics, such as polyethylene terephthalate (PET), ethylene-vinyl acetate copolymer, ethylene-vinyl alcohol copolymer (EVOH), and polystyrene; and metals (including alloys). If a plastic is used for the container, the plastic may be a polymer obtained by mixing or laminating some of those polymers. The container is permeable to 2 ppm or more of nitrogen. For example, 5 ppm or more or 7.5 ppm or more of nitrogen may permeate the container. The upper limit of nitrogen permeation may be, but is not limited to, 40 ppm or less.

The ink pack may be used, for example, as an ink cartridge or the like that is removably installed in an ink jet apparatus to supply ink compositions one after another to the ink jet head; an ink bottle or the like that is provided apart from the ink jet apparatus and from which only the ink composition is removed to the ink jet apparatus before use; or an ink tank or the like that contains an ink composition and is stationarily disposed in the ink jet apparatus.

Ink Jet Printing Method

The ink jet printing method according to an embodiment of the present disclosure may be, but is not limited to, a textile printing method. The textile printing method includes an ejection step of ejecting the above-described ink composition from an ink jet head to apply the ink composition onto a printing medium and may optionally include a pretreatment liquid application step of applying a pretreatment liquid onto the printing medium and/or a heating step of heating the printing medium after the ejection step.

In the pretreatment liquid application step, application of the pretreatment liquid may be, but is not limited to, roller coating, spray coating, or an ink jet method.

In some embodiments, the ejection step may be performed in such a manner that the ink composition is ejected from the ink jet head to apply the ink composition onto at least part of the region coated with the treatment liquid. The printing medium may be, but is not limited to, a natural or synthetic textile, such as a cloth of silk, cotton, sheep wool, nylon, polyester, rayon, or the like.

The heating step may be performed by, but is not limited to, oven drying (a technique not using a press) using a conveyor oven, a batch oven, or the like or heat pressing or wet drying. After the heating, the printed cloth may be washed and dried. At this time, soaping treatment, that is, washing out the unfixed pigment with a heat soap solution, may be performed, if necessary.

EXAMPLES

The subject matter of the present disclosure will be further described in detail with reference to Examples and Comparative Examples. However, the subject matter of the present disclosure is not limited to the following Examples.

Constituents of Ink Compositions

Mainly the following constituents were used in the ink compositions of the Examples and Comparative Examples.

Dyes
  Azo Group-Containing Dye
  Reactive Blue 13
  Reactive Orange 35
  Disperse Blue 360
  Acid Blue 193
  Dye Not Containing Azo Group
  Reactive Blue 15
Dispersant
  DEMOL N (formalin condensate of β-naphthalenesulfonic acid, produced by Kao)
Radical-Containing Hindered Amine Compound
  4-Hydroxy-2,2,6,6-tetramethylpiperidine-N-oxyl (molecular weight: 172)
  Tetramethylpiperidine-N-oxyl (molecular weight: 156)
Hindered Amine Compound Not Containing Radical
  ADK STAB LA-52 (produced by ADEKA)
Nitrogen-Containing Heterocyclic Compound
  2-Pyrrolidone
Surfactant
  OLFINE PD002W (acetylene glycol-based surfactant, produced by Nissin Chemical Industry)
  BYK 348 (silicone surfactant, produced by BYK)
  OLFINE E1010 (acetylene glycol-based surfactant, produced by Nissin Chemical Industry)
Alkylpolyol
  1,2-Hexanediol
  Diethylene glycol
  Propylene glycol
Other Additives
  Urea
  Triethanolamine
  EDTA (2% aq.)
  PROXEL XL-2 (produced by Avecia)
  Glycerin
  Triethylene glycol monomethyl ether
  Triethylene glycol monobutyl ether
  Benzotriazole
Cloth
  Cotton cloth (100% cotton)
  Polyester cloth (100% polyester)
  Silk cloth (100% silk)
Ink Pack
  Container made of an aluminum-deposited high-density polyethylene film (nitrogen permeation through the container: 0 ppm)
  Container made of high-density polyethylene film (nitrogen permeation through the container: 10 ppm)

Preparation of Ink Compositions

Ink compositions were prepared by mixing the constituents according to the respective compositions presented in Tables 1 and 2 for 2 hours with a magnetic stirrer, followed by filtration through a membrane filter with a 1 pore size. Then, each ink composition was degassed under reduced pressure to a dissolved nitrogen concentration presented in Table 1 or 2 and placed into the container permeable to an amount of nitrogen presented in Table 1 or 2, followed by storage at 60° C. for 6 days. The values in Tables and 2 are presented on a percent-by-mass basis, and the total content of each composition is 100.0% by mass. Measurement of Dissolved Nitrogen Concentration In the measurement of dissolved nitrogen concentration, the ink composition immediately after being placed in the container was measured in terms of mass with a gas chromatograph 6890N (manufactured by Agilent).

For measuring the nitrogen permeation through the container, degassed water having a dissolved nitrogen concentration of 2 ppm or less was placed into the containers. After storage at 60° C. for 6 days, the dissolved nitrogen concentration of the water was measured. The difference in dissolved nitrogen concentration between the water after storage at 60° C. for 6 days and the water immediately after deaeration was determined as the amount of nitrogen that permeated the container.

TABLE 1

| | | Example | | | | | | | |
|---|---|---|---|---|---|---|---|---|---|
| | | 1 | 2 | 3 | 4 | 5 | 6 | 7 | 8 |
| Dye | Reactive Blue 13 | 10 | 10 | 10 | 10 | 10 | — | — | — |
| | Reactive Orange 35 | — | — | — | — | — | 10 | 10 | — |
| | Reactive Blue 15 | — | — | — | — | — | — | — | — |
| | Disperse Blue 360 | — | — | — | — | — | — | — | 3.0 |
| | Acid Blue 193 | — | — | — | — | — | — | — | — |
| Dispersant | DEMOL N | — | — | — | — | — | — | — | 2.0 |
| Radical-containing hindered amine compound | 4-Hydroxy-2,2,6,6-tetramethylpiperidine-N-oxyl | 4.0 | 4.0 | 4.0 | 3.0 | 3.0 | 2.0 | 1.0 | 1.0 |
| | Tetramethylpiperidine-N-oxyl | — | — | — | — | — | — | — | — |
| Nitrogen-containing heterocyclic compound | 2-Pyrrolidone | 10 | 10 | 10 | 10 | 10 | 10 | 10 | — |
| Surfactant | OLFINE PD002W | 0.1 | 0.1 | 0.1 | 0.1 | 0.1 | 0.1 | 0.1 | — |
| | BYK348 | — | — | — | — | — | — | — | 0.5 |
| | OLFINE E1010 | — | — | — | — | — | — | — | — |
| Alkylpolyol | 1,2-Hexanediol | 3.0 | 3.0 | 3.0 | 3.0 | 3.0 | 3.0 | 3.0 | — |
| | Diethylene glycol | 8.0 | 8.0 | 8.0 | 8.0 | 8.0 | 8.0 | 8.0 | — |
| | Propylene glycol | 9.3 | 9.3 | 9.3 | 9.3 | 9.3 | 9.3 | 9.3 | 10 |
| Other constituents | Urea | 5.0 | 5.0 | 5.0 | 5.0 | 5.0 | 5.0 | 5.0 | — |
| | Triethanolamine | 0.5 | 0.5 | 0.5 | 0.5 | 0.5 | 0.5 | 0.5 | 1.0 |
| | EDTA (2% aq.) | 1.0 | 1.0 | 1.0 | 1.0 | 1.0 | 1.0 | 1.0 | — |
| | PROXEL XL-2 | 0.2 | 0.2 | 0.2 | 0.2 | 0.2 | 0.2 | 0.2 | — |
| | Glycerin | — | — | — | — | — | — | — | 10 |

TABLE 1-continued

|  |  |  |  |  |  |  |  |  |  |
|---|---|---|---|---|---|---|---|---|---|
|  | Triethylene glycol monomethyl ether | — | — | — | — | — | — | — | 5.0 |
|  | Triethylene glycol monobutyl ether | — | — | — | — | — | — | — | — |
|  | Benzotriazole | — | — | — | — | — | — | — | — |
| Water | Pure water | Balance | Balance | Balance | Balance | Balance | Balance | Balance | Balance |
|  | Total (mass %) | 100 | 100 | 100 | 100 | 100 | 100 | 100 | 100 |
|  | Dye/radical compound ratio | 2.5 | 2.5 | 2.5 | 3.3 | 3.3 | 5 | 10 | 3 |
|  | Dissolved nitrogen (ppm) in ink immediately after making pack | ≤2 | 10 | ≤2 | ≤2 | ≤2 | ≤2 | ≤2 | ≤2 |
|  | Nitrogen permeation (ppm) through container | 0 | 0 | 10 | 0 | 0 | 0 | 0 | 0 |
|  | Cloth material | Cotton | Cotton | Cotton | Cotton | Paper | Cotton | Cotton | Polyester |
| Test results | Color development | A | A | A | A | B | A | A | A |
|  | Continuous ejection consistency (after 6-day test at 60° C.) | A | B | B | A | A | A | A | A |
|  | Solubility | A | A | A | A | A | A | A | A |

|  |  |  | Example |  |  |  |  |  |  |
|---|---|---|---|---|---|---|---|---|---|
|  |  |  | 9 | 10 | 11 | 12 | 13 | 14 | 15 |
| Dye | Reactive Blue 13 |  | — | 10 | — | 10 | — | 10 | — |
|  | Reactive Orange 35 |  | — | — | 10 | — | 10 | — | 10 |
|  | Reactive Blue 15 |  | — | — | — | — | — | — | — |
|  | Disperse Blue 360 |  | — | — | — | — | — | — | — |
|  | Acid Blue 193 |  | 10 | — | — | — | — | — | — |
| Dispersant | DEMOL N |  | — | — | — | — | — | — | — |
| Radical-containing hindered amine compound | 4-Hydroxy-2,2,6,6-tetramethylpiperidine-N-oxyl |  | 4.0 | 5.0 | 5.0 | 0.2 | 0.2 | — | — |
|  | Tetramethylpiperidine-N-oxyl |  | — | — | — | — | — | 4.0 | 2.0 |
| Nitrogen-containing heterocyclic compound | 2-Pyrrolidone |  | — | 10 | 10 | 10 | 10 | 10 | 10 |
| Surfactant | OLFINE PD002W |  | — | 0.1 | 0.1 | 0.1 | 0.1 | 0.1 | 0.1 |
|  | BYK348 |  | — | — | — | — | — | — | — |
|  | OLFINE E1010 |  | 0.5 | — | — | — | — | — | — |
| Alkylpolyol | 1,2-Hexanediol |  | — | 3.0 | 3.0 | 3.0 | 3.0 | 3.0 | 3.0 |
|  | Diethylene glycol |  | 5.0 | 8.0 | 8.0 | 8.0 | 8.0 | 8.0 | 8.0 |
|  | Propylene glycol |  | — | 9.3 | 9.3 | 9.3 | 9.3 | 9.3 | 9.3 |
| Other constituents | Urea |  | — | 5.0 | 5.0 | 5.0 | 5.0 | 5.0 | 5.0 |
|  | Triethanolamine |  | 0.5 | 0.5 | 0.5 | 0.5 | 0.5 | 0.5 | 0.5 |
|  | EDTA (2% aq.) |  | 1.0 | 1.0 | 1.0 | 1.0 | 1.0 | 1.0 | 1.0 |
|  | PROXEL XL-2 |  | 0.3 | 0.2 | 0.2 | 0.2 | 0.2 | 0.2 | 0.2 |
|  | Glycerin |  | 17 | — | — | — | — | — | — |
|  | Triethylene glycol monomethyl ether |  | — | — | — | — | — | — | — |
|  | Triethylene glycol monobutyl ether |  | 7.0 | — | — | — | — | — | — |
|  | Benzotriazole |  | 1.0 | — | — | — | — | — | — |
| Water | Pure water |  | Balance | Balance | Balance | Balance | Balance | Balance | Balance |
|  | Total (mass %) |  | 100 | 100 | 100 | 100 | 100 | 100 | 100 |
|  | Dye/radical compound ratio |  | 2.5 | 2 | 2 | 20 | 20 | 2.5 | 5 |
|  | Dissolved nitrogen (ppm) in ink immediately after making pack |  | ≤2 | ≤2 | ≤2 | ≤2 | ≤2 | ≤2 | ≤2 |
|  | Nitrogen permeation (ppm) through container |  | 0 | 0 | 0 | 0 | 0 | 0 | 0 |
|  | Cloth material |  | Silk | Cotton | Cotton | Cotton | Cotton | Cotton | Cotton |
| Test results | Color development |  | A | A | A | A | A | A | A |
|  | Continuous ejection consistency (after 6-day test at 60° C.) |  | A | B | B | B | B | C | C |
|  | Solubility |  | A | A | A | A | A | C | C |

TABLE 2

|  |  |  | Comparative Example |  |  |  |  |  |
|---|---|---|---|---|---|---|---|---|
|  |  |  | 1 | 2 | 3 | 4 | 5 | 6 |
| Dye | Reactive Blue 13 |  | 10 | 10 | — | — | — | — |
|  | Reactive Orange 35 |  | — | — | 10 | — | — | — |
|  | Reactive Blue 15 |  | — | — | — | — | 10 | 10 |
|  | Disperse Blue 360 |  | — | — | — | 3.0 | — | — |
|  | Acid Blue 193 |  | — | — | — | — | — | — |
| Dispersant | DEMOL N |  | — | — | — | 2.0 | — | — |
| Radical-containing hindered amine compound | 4-Hydroxy-2,2,6,6-tetramethylpiperidine-N-oxyl |  | — | 4.0 | — | — | 4.0 | 1.0 |
|  | Tetramethylpiperidine-N-oxyl |  | — | — | — | — | — | — |

TABLE 2-continued

|  |  |  |  |  |  |  |  |
|---|---|---|---|---|---|---|---|
| Hindered amine compound not containing radical | ADK STAB LA-52 | — | — | — | — | — | — |
| Nitrogen-containing heterocyclic compound | 2-Pyrrolidone | 10 | 10 | 10 | — | 10 | 10 |
| Surfactant | OLFINE PD002W | 0.1 | 0.1 | 0.1 | — | 0.1 | 0.1 |
|  | BYK348 | — | — | — | 0.5 | — | — |
|  | OLFINE E1010 | — | — | — | — | — | — |
| Alkylpolyol | 1,2-Hexanediol | 3.0 | 3.0 | 3.0 | — | 3.0 | 3.0 |
|  | Diethylene glycol | 8.0 | 8.0 | 8.0 | — | 8.0 | 8.0 |
|  | Propylene glycol | 9.3 | 9.3 | 9.3 | 10 | 9.3 | 9.3 |
| Other constituents | Urea | 5.0 | 5.0 | 5.0 | — | 5.0 | 5.0 |
|  | Triethanolamine | 0.5 | 0.5 | 0.5 | 1.0 | 0.5 | 0.5 |
|  | EDTA (2% aq.) | 1.0 | 1.0 | 1.0 | — | 1.0 | 1.0 |
|  | PROXEL XL-2 | 0.2 | 0.2 | 0.2 | — | 0.2 | 0.2 |
|  | Glycerin | — | — | — | 10 | — | — |
|  | Triethylene glycol monomethyl ether | — | — | — | 5.0 | — | — |
|  | Triethylene glycol monobutyl ether | — | — | — | — | — | — |
|  | Benzotriazole | — | — | — | — | — | — |
| Water | Pure water | Balance | Balance | Balance | Balance | Balance | Balance |
|  | Total (mass %) | 100 | 100 | 100 | 100 | 100 | 100 |
|  | Dye/radical compound ratio | — | 2.5 | — | — | 2.5 | 10 |
|  | Dissolved nitrogen (ppm) in ink immediately after making pack | ≤2 | 100 | ≤2 | ≤2 | ≤2 | ≤2 |
|  | Nitrogen permeation (ppm) through container | 0 | 0 | 0 | 0 | 0 | 0 |
|  | Cloth material | Cotton | Cotton | Cotton | Polyester | Cotton | Cotton |
| Test results | Color development | A | A | A | A | C | C |
|  | Continuous ejection stability | D | D | D | D | A | A |
|  | Solubility | A | A | A | A | A | A |

|  |  | Comparative Example | | | | | |
|---|---|---|---|---|---|---|---|
|  |  | 7 | 8 | 9 | 10 | 11 | 12 |
| Dye | Reactive Blue 13 | — | — | — | — | 10 | — |
|  | Reactive Orange 35 | — | — | — | — | — | — |
|  | Reactive Blue 15 | 10 | 10 | 10 | 10 | — | — |
|  | Disperse Blue 360 | — | — | — | — | — | — |
|  | Acid Blue 193 |  |  |  |  |  | 10 |
| Dispersant | DEMOL N | — | — | — | — | — | — |
| Radical-containing hindered amine compound | 4-Hydroxy-2,2,6,6-tetramethylpiperidine-N-oxyl | 5.0 | 0.2 | — | — | — | — |
|  | Tetramethylpiperidine-N-oxyl | — | — | 4.0 | — | — | — |
| Hindered amine compound not containing radical | ADK STAB LA-52 | — | — | — | — | 4.0 | — |
| Nitrogen-containing heterocyclic compound | 2-Pyrrolidone | 10 | 10 | 10 | 10 | 10 | — |
| Surfactant | OLFINE PD002W | 0.1 | 0.1 | 0.1 | 0.1 | 0.1 | — |
|  | BYK348 | — | — | — | — | — | — |
|  | OLFINE E1010 | — | — | — | — | — | 0.5 |
| Alkylpolyol | 1,2-Hexanediol | 3.0 | 3.0 | 3.0 | 3.0 | 3.0 | — |
|  | Diethylene glycol | 8.0 | 8.0 | 8.0 | 8.0 | 8.0 | 5.0 |
|  | Propylene glycol | 9.3 | 9.3 | 9.3 | 9.3 | 9.3 | — |
| Other constituents | Urea | 5.0 | 5.0 | 5.0 | 5.0 | 5.0 | — |
|  | Triethanolamine | 0.5 | 0.5 | 0.5 | 0.5 | 0.5 | 0.5 |
|  | EDTA (2% aq.) | 1.0 | 1.0 | 1.0 | 1.0 | 1.0 | 1.0 |
|  | PROXEL XL-2 | 0.2 | 0.2 | 0.2 | 0.2 | 0.2 | 0.3 |
|  | Glycerin | — | — | — | — | — | 17 |
|  | Triethylene glycol monomethyl ether | — | — | — | — | — | — |
|  | Triethylene glycol monobutyl ether | — | — | — | — | — | 7.0 |
|  | Benzotriazole | — | — | — | — | — | 1.0 |
| Water | Pure water | Balance | Balance | Balance | Balance | Balance | Balance |
|  | Total (mass %) | 100 | 100 | 100 | 100 | 100 | 100 |
|  | Dye/radical compound ratio | 2 | 20 | 2.5 | — | — | — |
|  | Dissolved nitrogen (ppm) in ink immediately after making pack | ≤2 | ≤2 | ≤2 | ≤2 | ≤2 | ≤2 |
|  | Nitrogen permeation (ppm) through container | 0 | 0 | 0 | 0 | 0 | 0 |
|  | Cloth material | Cotton | Cotton | Cotton | Cotton | Cotton | Silk |
| Test results | Color development | C | C | C | C | A | A |
|  | Continuous ejection stability | A | A | A | A | D | D |
|  | Solubility | A | A | C | A | A | A |

Color Development

Each ink composition, after the above-described storage, was placed into the cartridge of an ink jet printer PX-G930 (manufactured by Seiko Epson) and applied onto a cloth or a plain paper presented in Table 1 or 2 at an ink rate of 23 mg/inch$^2$ with a resolution of 1440 dpi x 720 dpi to form an image pattern. The cloths on which the image pattern had been formed were each steamed at 102° C. for 10 minutes and then washed with an aqueous solution containing 0.2% by mass of a surfactant LACCOL STA (produced by Meisei Chemical Works) at 90° C. for 10 minutes, followed by drying. The resulting samples were evaluated. The cloths were subjected to pretreatment described below.

Pretreatment of Cloths

After sufficiently mixing 5 parts by mass of polyoxyethylene diisopropyl ether (oxyethylene: 30 mol), 5 parts by mass of etherified carboxymethyl cellulose, 100 parts by mass of urea, and 10 parts by mass of sodium m-nitrobenzenesulfonate, the mixture was slowly added to 1000 parts by mass of ion-exchanged water at 60° C. with stirring for 30 minutes. Subsequently, 30 parts by mass of sodium carbonate (an alkaline agent) was further added to the solution being stirred, followed by stirring for 10 minutes. The resulting solution was filtered through a membrane filter with a 10 pore size to yield a pretreatment liquid. The resulting pretreatment liquid was applied to the cloths presented in Tables 1 and 2 and dried by squeezing the cloths at a pick-up rate of 80% with a mangle.

The optical density (OD) of the samples was measured with a colorimeter FD-7 (manufactured by Konica Minolta) for evaluating the color development of the image. Evaluation criteria are as follows: When the OD value is rated B or higher, the sample is considered to be satisfactory for the effect of the present disclosure.

A: OD was 2.6 or more.
B: OD was from 2.4 to less than 2.6.
C: OD was from 2.2 to less than 2.4.
D: OD was less than 2.2.

Consistency in Continuous Ejection

Each ink composition, after the above-described storage, was placed into the cartridge of an ink jet printer PX-G930 (manufactured by Seiko Epson), and continuous printing was performed on 1000 A4 sheets of plain paper. The average number of sheets that were able to be continuously printed without cleaning was examined, and the consistency in continuous ejection was thus evaluated according to the following criteria. When the result is rated C or higher, the ink composition is considered to be satisfactory for the effect of the present disclosure.

A: Average number of continuously printed sheets was 80 or more.
B: Average number of continuously printed sheets was from 40 to less than 80.
C: Average number of continuously printed sheets was from 20 to less than 40.
D: Average number of continuously printed sheets was less than 20.

Solubility and Visual Examination

Ink compositions were prepared by mixing the constituents according to the respective compositions presented in Tables 1 and 2 with stirring for 2 hours with a magnetic stirrer. Each ink composition was placed into a 100 mL beaker without filtration through a membrane filter and checked for solids undissolved in the ink composition. Evaluation criteria are as follows:

A: No undissolved solids were seen.
B: Some undissolved solids with a diameter of 1 mm or less were seen.
C: Some undissolved solids with a diameter of from more than 1 mm to 2 mm were seen.
D: Some undissolved solids with a diameter of more than 2 mm were seen.

What is claimed is:

1. An ink jet ink composition, comprising:
   a dye having an azo group;
   water; and
   a hindered amine compound having a radical,
   wherein the ink jet composition has a dissolved nitrogen concentration of 10 ppm or less;
   wherein an amount of hindered amine compound is in a range of 1.0 to 10 % by mass.

2. The ink jet ink composition according to claim 1, wherein
   the dissolved nitrogen concentration is 2 ppm or less.

3. The ink jet ink composition according to claim 1, wherein
   the hindered amine compound has a hydroxy group.

4. The ink jet ink composition according to claim 1, wherein
   the dye is contained in the ink jet ink composition in a proportion, in terms of mass, of from 2.5 to 10 relative to the mass of the hindered amine compound.

5. The ink jet ink composition according to claim 1, wherein
   the hindered amine compound has a molecular weight of from 100 to 800.

6. The ink jet ink composition according to claim 1, wherein
   the ink jet ink composition is used for textile printing.

7. The ink jet ink composition according to claim 1, wherein
   the dye is at least one selected from the group consisting of Reactive Blue 13, Reactive Orange 35, Disperse Blue 360, and Acid Blue 193.

8. The ink jet ink composition according to claim 1, wherein
   the ink jet ink composition is stored in a container that is permeable to 2 ppm or more of nitrogen.

9. An ink pack comprising:
   a container that is permeable to 2 ppm or more of nitrogen; and
   the ink jet ink composition as set forth in claim 1, the ink jet ink composition being stored in the container.

10. An ink jet printing method comprising:
    ejecting the ink jet ink composition as set forth in claim 1 to apply the ink jet ink composition onto a printing medium.

* * * * *